May 22, 1962 A. A. SEIDA 3,035,766

DEVICE FOR PROGRESSIVELY RECORDING AMOUNTS OF PURCHASES

Filed Jan. 19, 1960 2 Sheets-Sheet 1

ALBERT A. SEIDA
*INVENTOR.*

BY James D. Givnan
ATTY

DEVICE FOR PROGRESSIVELY RECORDING AMOUNTS OF PURCHASES

Filed Jan. 19, 1960 2 Sheets-Sheet 2

ALBERT A. SEIDA
*INVENTOR.*

BY James D. Givnan
ATTY 3,035,766

DEVICE FOR PROGRESSIVELY RECORDING AMOUNTS OF PURCHASES

Albert A. Seida, Box 851, Canby, Oreg.
Filed Jan. 19, 1960, Ser. No. 3,297
2 Claims. (Cl. 235—125)

This invention relates generally to recording devices, and with regard to certain more specific features, to devices of this class for recording in monetary values progressive purchases of gasoline, oil, and similar products ordinarily obtainable at automotive service stations.

It is one of the principal objects of the invention to provide a device of the character described which is in the form of a self-contained unit, the various digits for indicating the progressive totals of purchases being contained on a tape or tapes movably housed within a neat compact casing and capable of being brought in succession before a window or windows and thus at all times maintained in a clean and legible condition.

Another object of the invention is to provide such a recording device in which the tape and hence the recorded purchases are advanced by means of a key which is inserted into the casing, thereby avoiding the objectionable appearance of knobs, cranks or other hand pieces permanently attached to the device and at the same time insuring that the device will not be manipulated except by the manager or other authorized representative of the automative service station under a license agreement with the producer of the device.

A further object of the invention is the provision of a locking mechanism, tape actuating mechanism, and tape punching and cancelling means all operable by a single key.

A still further object is the provision of removable single rolls of tape for individual redemption or one roll of continuous tape divided into progressive series of redeemable amounts and each being cancellable at the time of redemption before removal from the device.

The foregoing and other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 2, 2A:
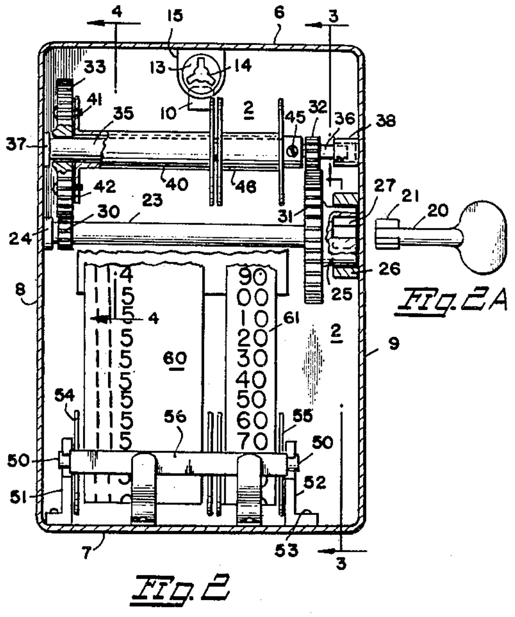
FIGURE 2 is a vertical sectional view similar to FIGURE 1 illustrating internal parts.
FIGURE 2A is a detail view of a key.
Figures 3, 4:
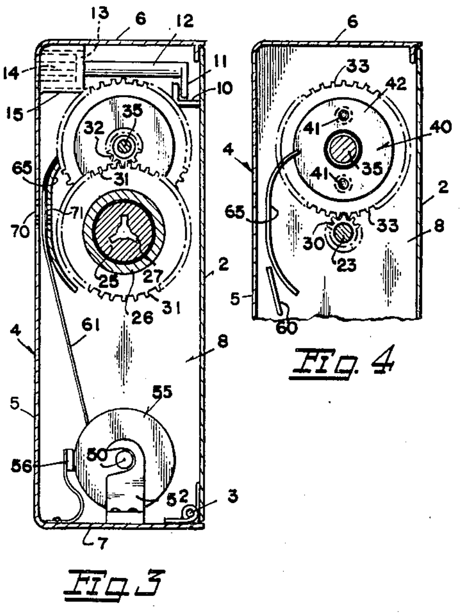

FIGURES 3 and 4 are sectional views taken respectively along the lines 3—3 and 4—4 of FIGURE 2.

Figure 1:
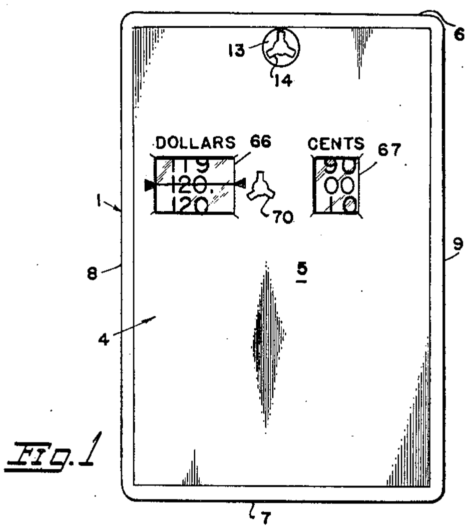
FIGURE 1 is a front elevational view of the recording device made in accordance with my invention.
Figure 5:
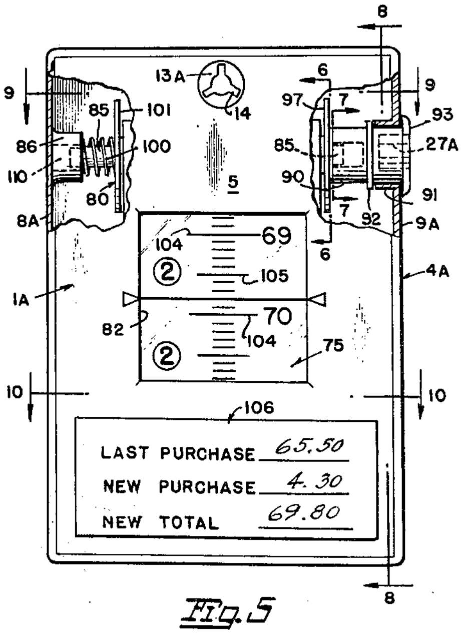
Figure 6:
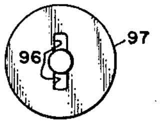
Figure 7:
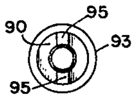
Figure 8:
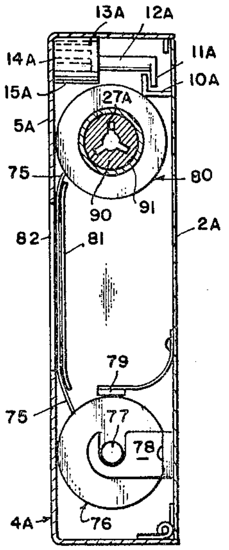
Figure 9:
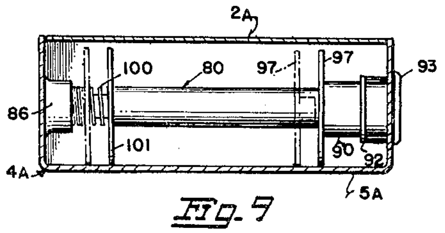
Figure 10:
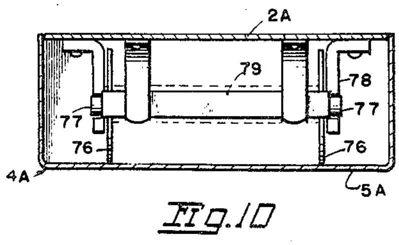

FIGURE 5 is a view similar to FIGURE 1 showing a modified form of the invention with fragments broken away for clearness of illustration;

FIGURES 6, 7, 8 and 9 are sectional views taken respectively along the lines 6—6, 7—7, 8—8 and 9—9 of FIGURE 5; and FIGURE 10 is a detail view of the brake shoe mechanism.

With continuing reference to the drawings, and particularly FIGURES 1 to 4 thereof, reference numeral 1 indicates generally a casing comprising a backing plate 2 to whose bottom end is hingedly attached as at 3 a cover indicated generally at 4. This cover can be made of stamped sheet metal or molded plastic and includes a front wall 5, top and bottom walls 6 and 7, and side walls 8 and 9, all of which extend over the corresponding edges of the backing plate as shown.

The cover 4 is lockable at its top end to the backing plate 2 by means of a keeper 10 secured to the backing plate and a detent 11 integrated with or secured to the inner end of a shaft 12 whose opposite end terminates in a cylindrical head 13 recessed as at 14 and rotatable within a cylindrical housing 15 secured to and depending from the underside of the top cover wall 6. This locking mechanism is operable by a key 20 (FIG. 2A) shaped as at 21 in end elevation to match and fit within the recess 14 of the head 13. It will be readily understood, of course, that keys having various bit formations could be used, but it is important that the key slots of the recess 14 be diametrically misaligned to prevent the use of a coin, blade or other instrumentality having a straight edge at one of its ends.

Rotatably mounted within the casing 1 is a shaft 23 journalled at one of its ends in a bearing 24, enlarged as at 25 at its opposite end and journaled in a bearing 26, both bearings being mounted on the side walls 8 and 9 of the cover 4. The shaft is rotatable by the key 20 when inserted in the corresponding recess 27 in the enlarged end 25 of the shaft. Secured to the shaft for rotation therewith are two driving gears 30 and 31 of a ratio respectively of 1 to 10. At all times enmeshed with these two driving gears are two driven gears 32 and 33 of a ratio respectively of 1 to 10 so that one revolution of the shaft 23 will impart ten revolutions to the driven gear 32 and one-tenth of a revolution to the other driven gear 33. The gear 33 is freely rotatable about one end of a shaft 35 whose opposite end is reduced in diameter as at 36 for securement to the driven gear 32. This shaft 35 is journaled in bearings 37 and 38 also mounted on the side walls 8 and 9 of the cover 4.

A wind-up reel 40, also freely rotatable relative to the shaft 35, is removably attached to the driven gear 33 by means of pins 41 carried by this gear and extending through one flange 42 of the reel. Secured as at 45 to the opposite end portion of the shaft 35 for rotation therewith is a second wind-up reel 46. From the foregoing it will be apparent that one revolution of the shaft 23 will impart ten revolutions to the reel 46 and one-tenth of a revolution to the reel 40.

In order to remove the reel 40 from the casing 1, it is merely necessary to grip the reel 46 and move it and the shaft 35 to which it is attached, as at 45, to the right as viewed in FIGURE 2. The extent of this movement, permitted by the end space in the bearing 38, is sufficient to disengage the opposite end of the shaft 35 from the bearing 37. Following this the gear 33 and reel 40 may be conveniently slid off that end of the shaft. To remove the reel 46 it is merely necessary to loosen the set screw 45.

Independently freely rotatable about a shaft 50, carried by brackets 51 and 52 secured as at 53 to the bottom wall 7 of the cover 4, are two idling reels 54 and 55 provided with a common spring-urged brake shoe 56 to set up a drag on these reels for a purpose to be more fully hereinafter described. Wound about the reel 54 is a tape 60 inscribed with series of numerals representing dollars and arranged ten in each series. Wound about the reel 55 is a tape 61 inscribed with series of numerals representing cents in increasing denominations of ten cents each in each series. As shown in FIGURE 2, the numerals representing $115.00 appear ten times in transverse registry with the cents numerals as their denominations progressively increase from 0 to 90 cents.

Both tapes 60 and 61 as they are drawn from their respective reels 54 and 55 by the wind-up reels 40 and 46 pass upwardly between a guide plate 65 and the front wall 5 of the cover 4 provided with windows or sight openings 66 and 67 through which portions of both tapes are visible as shown in FIGURE 1.

As previously pointed out, the device of this invention when used for the benefits and advantage of redeeming it for merchandise is evidence of accumulated cash payments to merchants issuing the devices, similar to books and fractions thereof of trading stamps whose values represent a cash discount, in many cases 2½%. Assuming that the last previous purchase totaled $114.70, this amount would appear in the windows with the 114 in the "dollars window" 66 and the 70 in the "cents window" 67, and assuming, further, that the next purchase amounted to $5.30. When this last amount has been paid to the merchant, he in turn inserts the key 20 into the key slots or receptacle 27 and rotates the shaft 23 the required number of times and/or fractions thereof to run the total up to the sum of $114.70 plus $5.30, which amounts to $120.00. This last amount will then appear in the windows 66 and 67 as shown in FIGURE 1 as evidence of the fact that progressive purchases totaling $120.00 have been made by the customer. The cover 4 can then be opened, by the same key 20, and the dollar tape removed and redeemed for merchandise valued at $3.00, or 2½% of $120.00.

As an alternative for the single redemption tape totaling $120.00 as just described, a tape containing multiple series of $120.00 each could be used, in which case the tape could be progressively cancelled as each $120.00 mark is reached by punching the tape adjacent each of said marks. This can be accomplished by inserting the key 20 in a corresponding opening 70 in the front cover wall 5, thrusting it through the tape and through an aligned corresponding opening 71 in the guide plate 65.

In the modified form of the invention shown in FIGURES 5–10 the backing plate 2A, hingedly attached cover 4A and key-actuated locking mechanism 10A—15A are the same as those shown in FIGURES 1–5, but only a single tape 75 is utilized. This tape is wound about an idling reel 76 cradled by its shaft 77 in brackets 78 mounted on the backing plate 2A and provided with a spring-urged brake shoe 79. The tape when drawn upwardly by a wind-up reel 80 passes between a guide plate 81 and window or sight opening 82 in the front cover wall 5A.

The wind-up reel 80 is secured to or integrated with a shaft 85 slidably journalled at one of its ends in a bearing 86 mounted on the cover wall 8A and similarly journalled at its opposite end in the inner end of a clutch member 90 rotatably mounted in a bearing 91 carried by the opposite cover wall 9A. The clutch member is held in place by an inner flange 92 adjacent the inner end of the bearing 91 and an outer flange 93 adjacent the outside of the cover wall 9A and surrounding the key recess 27A in the outer end of the clutch member 90. The inner end of this clutch member is provided with diametrically aligned lugs 95 adapted for inserted engagement within matching slots 96 in the flange 97 of the wind-up reel 80. Interengagement of the lugs with the slots is normally maintained by a compression spring 100 whose one end bears against the flange 101 of the wind-up spool and whose opposite end bears against the inner end of the bearing 86.

From the foregoing it will be apparent, as in the first form of the invention, that the shaft 85, and hence the wind-up reel 90, can only be rotated by interengagement of the key 20 with the key recess 27A. The tape 75 as shown in FIGURE 5 is inscribed with gradations 104 to represent dollars and intermediate gradations 105 to represent cents, increasing in denominations of ten cents each from each one dollars gradation to the next, as, for example, from $69 to $70 as shown, and wherein stoppage of the tape indicates that the latest purchase amounting to $4.30 added to the last previous purchase of $65.50 totals $69.80. For convenience in tabulating these amounts an area 106 is provided at the lower portion of the front cover wall 5A. The surface of this area may be coated with any suitable substance to withstand repeated erasures, or a suitable pad of tear-off sheets could be adhesively attached if desired.

To remove the wind-up reel 80 from the casing 1A it is merely necessary, as best shown in FIGURE 9, to move the reel and its shaft 85 to the left. The extent of this movement, permitted by the end space 110 in the bearing 86, is sufficient to disengage the slots 96 in the reel flange 97 from the lugs 95 on the adjacent end of the clutch member 90.

The respective brake shoes 56 and 79 in the first and second forms of the invention herein shown and described set up sufficient drag on their respective tapes to hinder over-running thereof during wind-up operations.

While I have shown particular forms of embodiment of my invention I am aware that many minor changes therein will readily suggest themselves to others skilled in the art without departing from the spirit and scope of the invention.

Having thus described my invention what I claim as new and desire to protect by Letters Patent is:

1. A device for tape-recording in monetary values progressive purchases of goods from merchants, said device comprising a casing, a lockable closure for the casing, said casing comprising a backing plate, a box-like cover having top, bottom, front and side walls hingedly attached at one of its ends by its bottom wall to one end of the backing plate and having two sight openings therein, interengaging key-actuated locking mechanism carried by the opposite end of said backing plate and cover, a key having a bit end for actuating the locking mechanism, a guide plate spaced inwardly from said front wall of the cover and having an opening therein matching said bit end of the key, two idling reels rotatably mounted within the casing at one end thereof, two wind-up reels rotatably mounted within the casing at the opposite end thereof, a tape payable from each idling reel upwardly between said guide plate with one of said tapes passing over said opening the guide plate to each of the wind-up reels, each tape inscribed with numerals representing monetary values, one of said wind-up reels secured to a shaft rotatable within the casing, the other of said wind-up reels rotatable about said shaft, a second shaft rotatably mounted within the casing and rotatable by said key of the locking mechanism, means operatively interconnecting said shafts for imparting rotation to said one of said wind-up reels independent of rotation imparted to the other of said wind-up reels by said second shaft, whereby said numerals on said tapes will become progressively visible through said sight openings during passage of the tapes from the idling reels to the wind-up reels, and whereby said one of said tapes can be cancelled at predetermined intervals by inserting said bit end of the key through said opening in the front cover wall, through the tape and through said opening in the guide plate.

2. A device for tape-recording in monetary values progressive purchases of goods from merchants, said device comprising a casing, a lockable closure for the casing, said casing comprising a backing plate, a box-like cover having top, bottom, front and side walls and hingedly attached at one of its ends by its bottom wall to one end of the backing plate and having a sight opening in its front wall, interengaging locking mechanism carried by the opposite end of said backing plate and cover, a key having a bit end for actuating the locking mechanism, an idling reel rotatably mounted within the casing at the bottom end thereof, a wind-up reel carried by a shaft rotatably and slidably mounted at one of its ends in a bearing at the top end of the casing, the opposite end of said shaft slidably mounted in a clutch member rotatably mounted in a companion bearing and normally engaged with said wind-up reel, whereby said shaft and hence the reel may be removed from the casing by sliding the shaft relative to both of said bearings to thereby disengage the reel from said clutch member, said clutch member having an outwardly opening recess in one of its ends matching said bit end of the key whereby rotation to the wind-up reel may be imparted by insertion and rotation of the key.

References Cited in the file of this patent

UNITED STATES PATENTS

| | | |
|---|---|---|
| 124,270 | Hogt | Mar. 5, 1872 |
| 593,715 | Bigelow | Nov. 16, 1897 |
| 1,518,476 | Ball | Dec. 9, 1924 |
| 1,953,630 | Phillips | Apr. 3, 1934 |
| 2,106,005 | Kennedy | Jan. 18, 1938 |